US012715504B2

(12) United States Patent
Suplin et al.

(10) Patent No.: US 12,715,504 B2
(45) Date of Patent: Aug. 25, 2026

(54) DRIVER ATTENTION BASED PREDICTIVE VEHICLE MOTION CONTROL

(71) Applicant: GM Global Technology Operations LLC, Detroit, MI (US)

(72) Inventors: Vladimir Suplin, Modi'in Makabim-Re'ut (IL); Daniel Y. Rubin, Holon (IL); Tzvi Philipp, Bet Shemesh (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 76 days.

(21) Appl. No.: 18/825,773

(22) Filed: Sep. 5, 2024

(65) Prior Publication Data

US 2026/0062049 A1 Mar. 5, 2026

(51) Int. Cl.
*B62D 6/00* (2006.01)

(52) U.S. Cl.
CPC .................................. *B62D 6/001* (2013.01)

(58) Field of Classification Search
CPC .................................................... B62D 6/001
See application file for complete search history.

(56) References Cited

U.S. PATENT DOCUMENTS 10,552,695 B1 2/2020 Bush et al.
10,752,253 B1 8/2020 Nath et al.
12,122,365 B2 * 10/2024 Ersal ................ B60W 60/0015
2012/0218093 A1 * 8/2012 Yoshizawa ............ G08G 1/166 340/435
2019/0047588 A1 * 2/2019 Yabuuchi ............ G06V 20/597
2019/0255989 A1 * 8/2019 Rowell ............... G06V 20/597
2021/0380140 A1 * 12/2021 McGill ............... G05D 1/0088
2022/0001861 A1 * 1/2022 Ersal .................... B60W 10/20
2022/0315047 A1 * 10/2022 Probst .................. B60W 30/16
2023/0139003 A1 * 5/2023 Bhasme ................. B60L 58/16 701/533
2025/0022290 A1 1/2025 Sivaraman et al.
2025/0065844 A1 2/2025 Shetty et al.
2025/0078296 A1 3/2025 Tabuchi

OTHER PUBLICATIONS

German Office Action for German Application No. 102024131721.3; dated Jul. 4, 2025; 3 pages.

* cited by examiner

*Primary Examiner* — Joseph J Dallo
(74) *Attorney, Agent, or Firm* — CANTOR COLBURN LLP

(57) ABSTRACT

A vehicle including a steering input, a driver monitoring system, a controlled electro-mechanical actuator, a controller in communication with the steering input and the driver monitoring system, the controller including a memory and a processor, the memory storing a driver command interpreter module and a vehicle motion control module, and wherein the driver command interpreter module is configured to estimate an upcoming vehicle maneuver based at least in part on a commanded steering operation from the steering input and a driver viewing direction from the driver monitoring system.

20 Claims, 2 Drawing Sheets

DRIVER ATTENTION BASED PREDICTIVE VEHICLE MOTION CONTROL

INTRODUCTION

The subject disclosure relates to vehicle motion controls, and more particularly to providing an improved response time using predictive vehicle motion control.

Steering inputs such as traditional steering mechanisms, steer by wire, and any other vehicle motion control system may not be physically connected to the structures (e.g. wheels) that implement the steering operation. Such systems rely on controllers to interpret received steering commands and implement the steering operation via control commands. It is desirable to provide a steering response that is both agile and stable for vehicle motion control in such systems.

SUMMARY

In one exemplary embodiment a vehicle including a steering input, a driver monitoring system, a controlled electro-mechanical actuator, a controller in communication with the steering input and the driver monitoring system, the controller including a memory and a processor, the memory storing a driver command interpreter module and a vehicle motion control module, and wherein the driver command interpreter module is configured to estimate an upcoming vehicle maneuver based at least in part on a commanded steering operation from the steering input and a driver viewing direction from the driver monitoring system.

In addition to one or more of the features described herein the driver monitoring system includes camera defining a field of view including a driver and wherein the driver monitoring system is configured to identify at least one of a gaze of a driver and a head pose of the driver based at least in part on an image generated by the camera.

In addition to one or more of the features described herein the vehicle further includes at least one external sensor in communication with the controller, wherein the external sensor is configured to identify at least one parameter extrinsic to the vehicle.

In addition to one or more of the features described herein the at least one parameter extrinsic to the vehicle includes at least one of an object, a road condition and a road direction.

In addition to one or more of the features described herein the controller is configured to identify an intersection of a position of the at least on parameter extrinsic to the vehicle and the driver viewing direction, and wherein the controller is configured to identify a distracted condition when the intersection is not along a trajectory of the estimated upcoming vehicle maneuver.

In addition to one or more of the features described herein the driver command interpreter module includes a prediction module configured to predict the vehicle maneuver and a kinematic equation module configured to determine a kinematic operation of the predicted vehicle maneuver.

In addition to one or more of the features described herein the predicted vehicle maneuver is a sequence of steering angles at predefined time increments.

In addition to one or more of the features described herein the kinematic operation of the predicted vehicle maneuver is a sequence of yaw rates at predefined time increments.

In addition to one or more of the features described herein the driver monitoring system is configured to identify a segment of at least two segments in which a driver's view is located, and wherein the driver viewing direction is the identified segment.

In addition to one or more of the features described herein the at least two segments include a left segment and a right segment.

In addition to one or more of the features described herein the at least two segments further include a center segment.

In another exemplary embodiment a method for operating a vehicle includes receiving a steering command from a steering input at a controller, receiving a driver monitoring signal at the controller, determining a driver viewing direction based on the driver monitoring signal, using the controller, determining a predicted vehicle maneuver based at least in part on the driver viewing direction and the received steering command, and operating a steering assist based on the predicted vehicle maneuver using a vehicle motion control module.

In addition to one or more of the features described herein determining the predicted vehicle maneuver further comprises generating a kinematic reference model of the predicted vehicle maneuver.

In addition to one or more of the features described herein the predicted vehicle maneuver is a sequence of steering angles at predefined time increments.

In addition to one or more of the features described herein generating the kinematic reference model comprises providing the sequence of steering angles at predefined time increments to a kinematic vehicle model and generating a sequence of yaw rates at predefined time increments.

In addition to one or more of the features described herein the predicted vehicle maneuver is further based at least in part on a vehicle operating parameter detected by at least one vehicle sensor.

In addition to one or more of the features described herein determining the driver viewing direction includes identifying a segment of at least two segments in which a driver's view is located, and wherein the driver viewing direction is the identified segment.

In addition to one or more of the features described herein the at least two segments include a left segment and a right segment.

In addition to one or more of the features described herein the at least two segments further include a center segment.

In addition to one or more of the features described herein determining the predicted vehicle maneuver is further based at least in part on at least one object detection.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
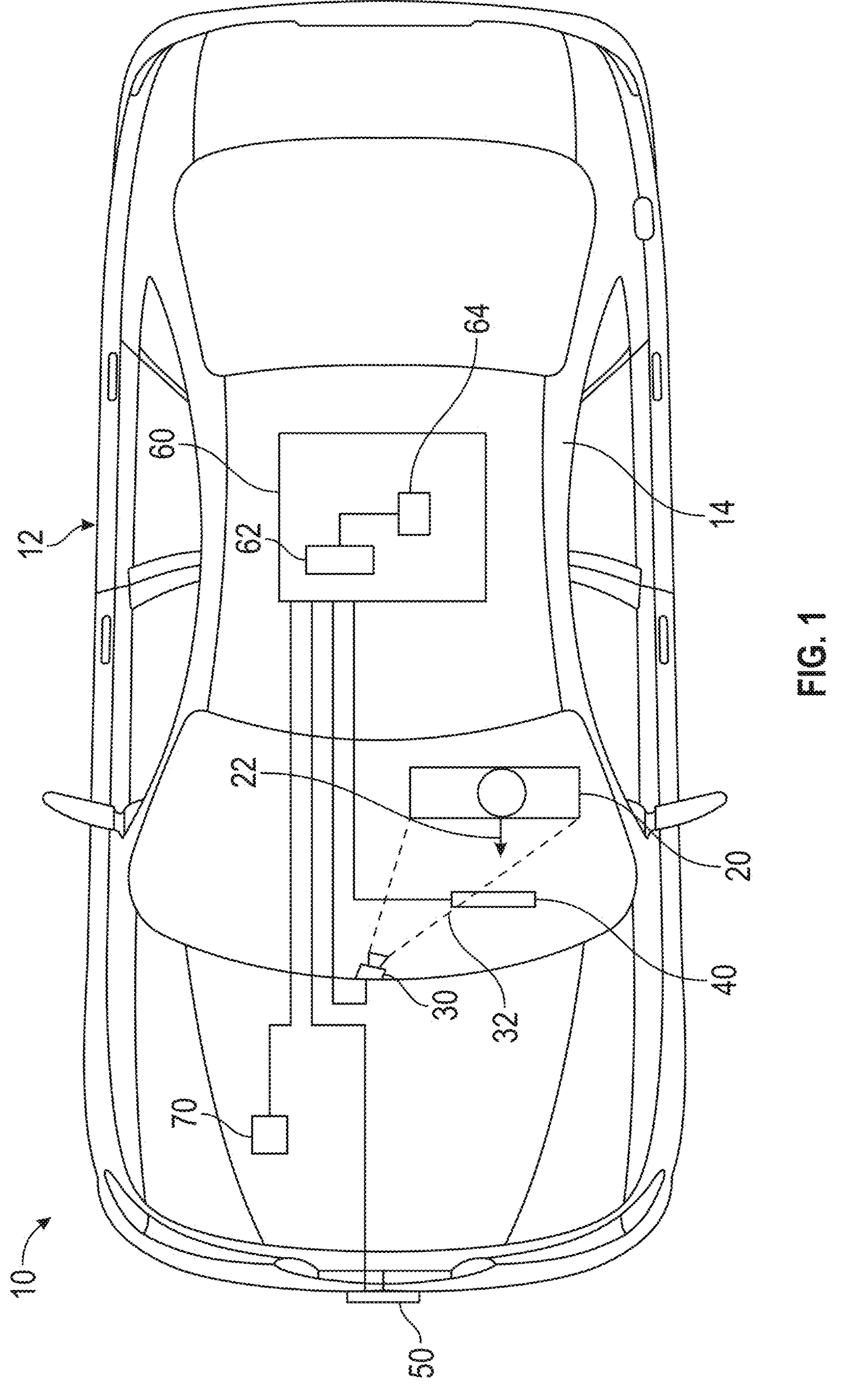
FIG. 1 is a vehicle including a predictive vehicle motion control system.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a vehicle includes a pose and/or gaze tracking system configured to identify a head pose (alternately referred to as pose) and/or gaze of the vehicle operator. The pose and/or gaze are collectively referred to herein as a driver viewing direction. A controller within the vehicle receives a steering command from a steering input and determines a predicted maneuver based on a combination of the steering command, vehicle velocity, and the driver viewing direction. Once the predicted maneuver is determined, the controller begins implementation of the predicted maneuver, thereby executing steering commands aligned with a perceived driver intent and supporting the driver's predicted future operations.

Embodiments described herein present numerous advantages and technical effects. Included among the advantages and technical effects is a reduction in response times dues to an ability to differentiate between steering maneuvers that begin with similar or identical steering command inputs.

The embodiments are not limited to use with any specific vehicle or vehicle type and may be applicable to various contexts. For example, while described within the context of a passenger vehicle, it is appreciated that the process can be implemented in any vehicle including commercial shipping trucks, industrial equipment, aircraft, water vessels, and any similar mobile platforms utilizing electro mechanical actuator based controls including steer by wire, torque vectoring, rear steer, active aerodynamic features, active suspension, adaptive suspension and/or electric power steering (EPS) or similar controls.

FIG. 1 illustrates a vehicle 10 include a vehicle body 12 defining a passenger compartment 14. A driver 20 is located at a driver's position within the passenger compartment 14. A camera 30 defines a field of view 32 including the driver 20. The camera 30 provides recorded images to a controller 60. Similarly sensors 50, such as front facing cameras, light detection and ranging (LiDAR) sensors, radar sensors, or a combination of similar sensors detect a surrounding environment and provide the detections to the controller 60.

A steering input 40, such as a steering wheel, is operated by the driver 20 and provides an input to the controller. The vehicle 10 operates on a pure steer by wire system, where the steering input 40 provides electrical signals to the controller 60, and the controller provides electrical controls to one or more local steering systems on the vehicle 10.

A set of vehicle sensors 70 are distributed about the vehicle and provide detections to the controller 60. The vehicle sensors 70 can include revolutions per minute (RPM) sensors, speed sensors, airflow sensors, and any other sensors configured to detect one or more operation metrics of the vehicle 10.

The controller 60 can be a dedicated steering controller, a general vehicle controller including software and/or hardware modules configured to control vehicle maneuvers, a set of distributed controllers in communication with each other and configured to work cooperatively to implement control processes, and/or any combination thereof. Included within the controller 60 is a driver command interpreter 62. The driver command interpreter 62 is configured to interpret commands from the steering input 40, as well as inputs from the camera 30 and the sensors 50, 70. In addition, the controller 60 includes a motion control module 64. The motion control module 64 is configured to receive the interpreted command and generate motion control outputs to the components of the vehicle 10 configured to implement the vehicle motion control.

The motion control 64 uses the driver command interpreter 62 to predict an intended trajectory of the maneuver and aids the driver in achieving the maneuver by tracking the predicted trajectory using steer by wire, torque vectoring, rear steer, an active aerodynamic feature, active suspension, adaptive suspension and/or electric power steering (EPS) or any combination thereof. This tracking, in turn, provides a smoother vehicle maneuver and an improved vehicle stability and/or agility. Such improvements can further increase driver confidence in vehicle behaviors and capabilities during evasive maneuvers.

Figure 2:
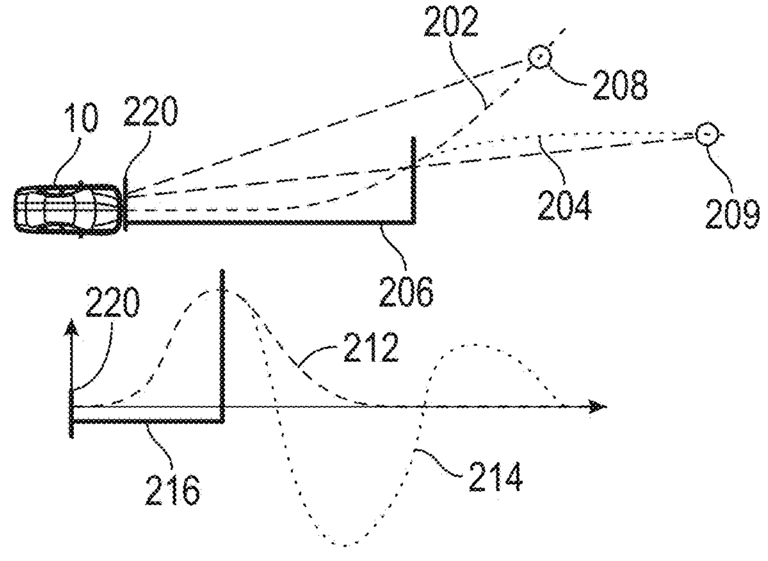
FIG. 2 depicts an example divergence between two possible vehicle maneuvers.

During vehicle 10 operation, multiple distinct vehicle maneuvers can begin with the same steering command. FIG. 2 illustrates drive paths 202, 204 and yaw rates 212, 214 of the vehicle 10 for a turning maneuver (drive path 202, yaw rate 212) and a lane change maneuver (drive path 204, yaw rate 214). An initial portion 206 of the drive paths 202, 204 for both maneuvers is identical, and will be reflected in identical operations of the steering input 40 (illustrated in FIGS. 1 and 3). Similarly, the yaw rates 212, 214 are identical for an initial portion 216 of the maneuver. As the different maneuvers are not completed in the same manner, the controller 60, and particularly the motion control 64 cannot plan the full vehicle maneuver until the driver command interpreter 62 can differentiate between the possible maneuvers. Lane changes and turning are used as examples herein, and the system and processes can be utilized to differentiate between any number of maneuvers without being limited to lane changes and turning.

One variation between the maneuvers that can be identified earlier than the bifurcation of either steering command or yaw rate is a position 208, 209 toward which the driver's viewing direction is oriented. This position 208, 209 can be determined using a gaze direction and/or head pose of the driver 20, each of which can be determined using existing systems incorporated into the controller 60. The driver command interpreter 62 synthesizes both the command from the steering input 40 and the detected driver view direction and differentiates which vehicle maneuver is being commanded at a start 220 of the maneuver, rather than waiting until either of the shared portions 206, 216 bifurcate.

In some implementations, the detected driver viewing direction can be supplemented using object detection information provided by the sensors 50. By way of example, when the sensors 50 detect an obstacle ahead of the vehicle 10, while the driver's viewing direction is straight forward, the driver command interpreter can interpret the command from the steering input 40 as being an evasion maneuver with an intent to return to the current lane of operation after the object has been avoided. Similarly, when the sensors 50 detect a turn in the road and the driver's viewing direction is aligned with the turn, the driver command interpreter 62 can determine that the signal received from the steering input 40 is a turning command.

Figure 3:
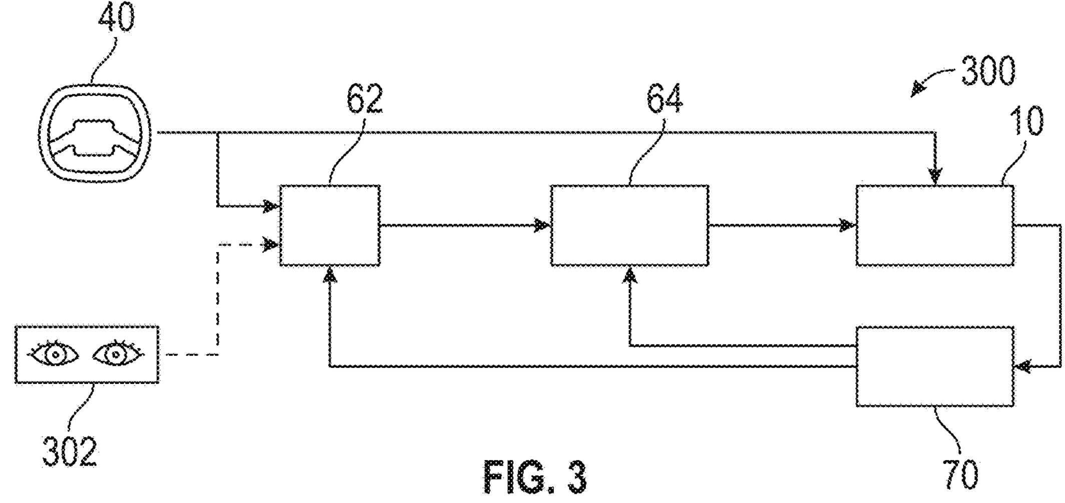
FIG. 3 is a control diagram for the predictive vehicle motion control of FIG. 1.

With continued reference to FIGS. 1 and 2, FIG. 3 illustrates a control diagram 300 for the predictive vehicle motion control of the vehicle 10 of FIGS. 1 and 2. The driver command interpreter 62 receives inputs from both the steering input 40 and a driver viewing direction detector 302. The driver command interpreter 62 combines the viewing direction and the steering input to identify the vehicle trajectory being operated at the earliest point at which the vehicle maneuver can be distinguished. This determined vehicle trajectory is provided to the vehicle motion control 64, and the vehicle motion control 64 provides control command(s) to the vehicle 10 to implement the trajectory. Simultaneously with the assistive controls, the command from the steering input 40 is provided directly to the vehicle 10. The direct provision of the steering command operates to supplement a mechanical steering command in cases where the control command(s) are not implemented using a steer by wire system.

Outputs of the vehicle sensors 70 are also provided to the driver command interpreter 62 and the motion control 64 in a feedback arrangement to further enhance both the interpretation of the commanded maneuver and the motion controls generated by the motion control 64.

Figure 4:
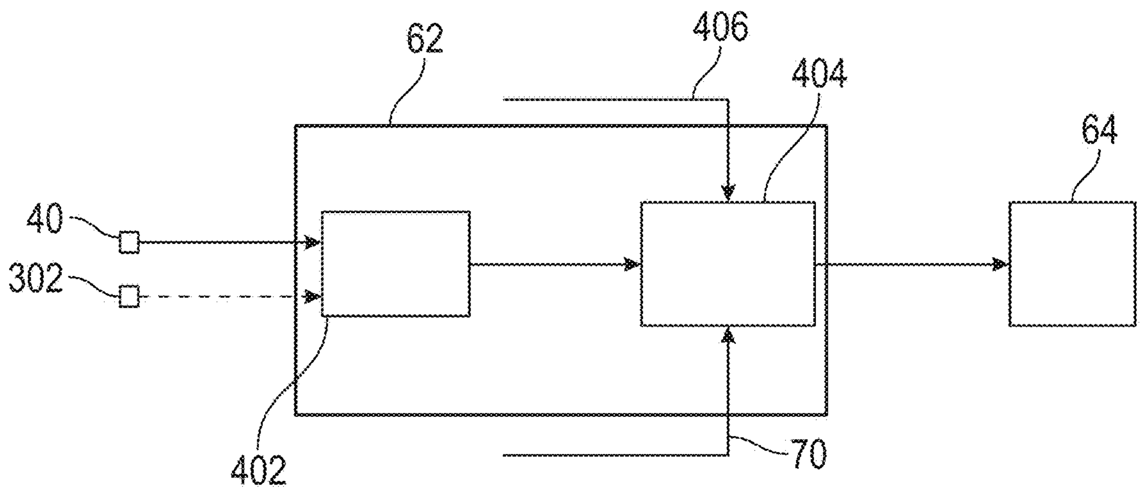
FIG. 4 is a more detailed implementation of a position of the control diagram of FIG. 3.

With continued reference to FIG. 3, FIG. 4 illustrates a detailed implementation of the driver command interpreter 62 according to one example. In the example, the driver command interpreter 62 includes a predictor component 402 that receives a steering angle from the steering command 40 and a driver viewing direction from the driver viewing direction detector 302. The predictor 402 combines the current steering angle at time t with the detected driver viewing direction and predicts a sequence of steering angles at times t+1, t+2 . . . t+n.

The predicted sequence of steering angles is provided to a set of kinematic equations 404. Also provided to the set of kinematic equations 404 is a current velocity 406 of the vehicle 10, as well as any other information from the vehicle sensors 70. The kinematic equations are a mathematical model of vehicle motion, and can be structured according to any known motion model. The motion model can be kinematic, dynamic or a combination thereof. The kinematic equations 404 output an expected reference yaw rate to the vehicle motion control 64, and the expected reference yaw rate represents the expected path for the vehicle maneuver. The vehicle motion control 64 can then use the expected path to perform steer by wire, torque vectoring, rear steer, and/or electric power steering (EPS) or similar controls, thereby providing a requested vehicle maneuver.

With reference to FIGS. 1-4, in one example, the driver viewing direction is classified as two or more segments in the driver command interpreter 62. In one example, the segments correspond to defining the driver's view as left (looking out a left side window or right (looking out a right side window). In another example, a third segment defining the driver's viewing direction as straight (looking forward) can be defined. By defining the driver's viewing direction as being within a segment, the driver command interpreter 62 can differentiate which maneuver may be being commanded, as the precise viewing direction does not need to be considered, only which segment the viewing direction falls in.

In alternative examples, more segments may be utilized or the precise viewing position may be considered depending on the available process power of the vehicle 10 in which the system is incorporated.

Furthermore, the addition of map information regarding the road on which the vehicle 10 is traveling can provide further assistance in distinguishing the predicted maneuver, and can be provided to the driver command interpreter alongside the commanded steering angle and the driver's viewing direction.

In yet another example, the controller 60 may identify an intersection of a position of an object exterior to the vehicle and the driver's viewing direction, indicating that the driver is viewing the object. In this example, input from the vision sensors can be used to determine the correlation between the projected trajectory and the driver's viewing direction, and this correlation can be used to distinguish between an obstacle that should be avoided and a distraction event. When the object is not aligned with the projected trajectory of the vehicle maneuver, the controller 60 can further detect a potential distraction event. The distraction event can then be provided to any other vehicle systems for alerts, responses, and the like.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:

a steering input;

a driver monitoring system;

a controlled electro-mechanical actuator;

at least one external sensor in communication with the controller, wherein the external sensor is configured to identify at least one parameter extrinsic to the vehicle wherein the at least one parameter extrinsic to the vehicle includes at least one of an object, a road condition and a road direction;

a controller in communication with the steering input and the driver monitoring system, the controller including a memory and a processor, the memory storing a driver command interpreter module and a vehicle motion control module;

wherein the controller is configured to identify an intersection of a position of the at least on parameter extrinsic to the vehicle and the driver viewing direction, and wherein the controller is configured to identify a distracted condition when the intersection is not along a trajectory of the estimated upcoming vehicle maneuver;

wherein the driver command interpreter module is configured to estimate an upcoming vehicle maneuver based at least in part on a commanded steering operation from the steering input and a driver viewing direction from the driver monitoring system; and determining a steering assist operation based on the estimated upcoming vehicle maneuver and the distracted condition and implementing the steering assist operation using the controlled electromechanical actuator.

2. The vehicle of claim 1, wherein the driver monitoring system includes camera defining a field of view including a driver and wherein the driver monitoring system is configured to identify at least one of a gaze of a driver and a head pose of the driver based at least in part on an image generated by the camera.

3. The vehicle of claim 1, further comprising responding to identification of the distracted condition by generating an alert.

4. The vehicle of claim 1, wherein the controller is configured to distinguish between an obstacle to be avoided by the vehicle and a distraction event.

5. The vehicle of claim 1, wherein the driver command interpreter module includes a prediction module configured to predict the upcoming vehicle maneuver and a kinematic equation module configured to determine a kinematic operation of the predicted vehicle maneuver.

6. The vehicle of claim 5, wherein the predicted vehicle maneuver is a sequence of steering angles at predefined time increments.

7. The vehicle of claim 5, wherein the kinematic operation of the predicted vehicle maneuver is a sequence of yaw rates at predefined time increments.

8. The vehicle of claim 1, wherein the driver monitoring system is configured to identify a segment of at least two segments in which a driver's view is located, and wherein the driver viewing direction is the identified segment.

9. The vehicle of claim 8, wherein the at least two segments include a left segment and a right segment.

10. The vehicle of claim 9, wherein the at least two segments further include a center segment.

11. A method for operating a vehicle comprising:

identifying at least one parameter extrinsic to the vehicle using at least one external sensor in communication with a controller, wherein the at least one parameter extrinsic to the vehicle includes at least one of an object, a road condition and a road direction receiving a steering command from a steering input at a controller;

receiving a driver monitoring signal at the controller;

determining a driver viewing direction based on the driver monitoring signal, using the controller;

determining a predicted vehicle maneuver based at least in part on the driver viewing direction and the received steering command;

identifying an intersection of a position of the at least one parameter extrinsic to the vehicle and the driver viewing direction;

identifying a distracted condition of a driver responsive to the intersection being not along a trajectory of the estimated upcoming vehicle maneuver; and operating a steering assist-based on the predicted vehicle maneuver by using a vehicle motion control module to operate a controlled electromechanical actuator.

12. The method of claim 11, wherein determining the predicted vehicle maneuver further comprises generating a kinematic reference model of the predicted vehicle maneuver.

13. The method of claim 12, wherein the predicted vehicle maneuver is a sequence of steering angles at predefined time increments.

14. The method of claim 13, wherein generating the kinematic reference model comprises providing the sequence of steering angles at predefined time increments to a kinematic vehicle model and generating a sequence of yaw rates at predefined time increments.

15. The method of claim 11, wherein the predicted vehicle maneuver is further based at least in part on a vehicle operating parameter detected by at least one vehicle sensor.

16. The method of claim 11, wherein determining the driver viewing direction includes identifying a segment of at least two segments in which a driver's view is located, and wherein the driver viewing direction is the identified segment.

17. The method of claim 16, wherein the at least two segments include a left segment and a right segment.

18. The method of claim 17, wherein the at least two segments further include a center segment.

19. The method of claim 11, wherein determining the predicted vehicle maneuver is further based at least in part on at least one object detection.

20. The method of claim 11, further comprising responding to the distracted condition by alerting the driver of the distracted condition.

* * * * *